(12) United States Patent
Pedersen

(10) Patent No.: US 6,340,440 B1
(45) Date of Patent: Jan. 22, 2002

(54) PROCESS OF MAKING A TUBULAR CONTAINER

(75) Inventor: Jan Rune Pedersen, Odense (DK)

(73) Assignee: Plastech A.p.S., Svendborg (SE)

( * ) Notice: Subject to any disclaimer, the term of this patent is extended or adjusted under 35 U.S.C. 154(b) by 0 days.

(21) Appl. No.: 09/685,365

(22) Filed: Oct. 10, 2000

Related U.S. Application Data

(63) Continuation of application No. 08/875,781, filed as application No. PCT/SE96/00139 on Feb. 6, 1996, now abandoned.

(30) Foreign Application Priority Data

Feb. 7, 1995 (SE) ............................................... 9500455

(51) Int. Cl.$^7$ ........................... B29C 55/22; B29D 23/00
(52) U.S. Cl. ..................... 264/138; 264/292; 264/322; 264/323; 264/328.1
(58) Field of Search ................................ 264/138, 292, 264/322, 323, 328.1

(56) References Cited

U.S. PATENT DOCUMENTS

| | | | | |
|---|---|---|---|---|
| 3,855,381 A | * | 12/1974 | Eckstein et al. | 264/292 |
| 4,250,138 A | | 2/1981 | Okita | 264/292 X |
| 4,340,352 A | | 7/1982 | Hayberg | 264/238 X |
| 4,354,996 A | * | 10/1982 | Nishiyama et al. | 264/323 X |
| 4,419,320 A | * | 12/1983 | Perkins et al. | 264/323 X |
| 4,519,977 A | | 5/1985 | Kawaguchi et al. | 264/323 X |
| 4,563,325 A | | 1/1986 | Coffman | 264/323 X |
| 4,564,493 A | * | 1/1986 | Nilsson et al. | 264/292 X |
| 4,564,495 A | * | 1/1986 | Nilsson et al. | 264/291 |
| 4,569,866 A | * | 2/1986 | Jakobsen et al. | 428/35 |
| 4,580,968 A | * | 4/1986 | Jakobsen et al. | 425/393 |
| 4,595,550 A | | 6/1986 | Jakobsen et al. | 264/323 X |
| 4,783,056 A | * | 11/1988 | Abrams | 264/294 X |
| 4,801,419 A | | 1/1989 | Ward et al. | 264/292 X |
| 4,828,783 A | | 5/1989 | Albrecht et al. | 264/323 X |
| 4,847,032 A | | 7/1989 | Albrecht et al. | 264/323 X |
| 4,930,644 A | | 6/1990 | Robbins, III | 215/382 |
| 5,039,462 A | | 8/1991 | ChiLo et al. | 264/323 X |
| 5,067,888 A | | 11/1991 | Torsten | 264/323 X |
| 5,409,658 A | * | 4/1995 | Nilsson | 264/292 X |
| 5,573,129 A | | 11/1996 | Nagata et al. | 215/382 |
| 5,656,225 A | | 8/1997 | Pedersen | 264/323 X |

FOREIGN PATENT DOCUMENTS

| | | |
|---|---|---|
| DE | 2752416 | 6/1978 |
| GB | 2275648 | 9/1994 |
| SE | 468666 | 3/1993 |
| SE | 469882 | 10/1993 |

* cited by examiner

*Primary Examiner*—Leo B. Tentoni
(74) *Attorney, Agent, or Firm*—Ladas & Parry

(57) ABSTRACT

A method for producing a tubular container of plastic material, in which the plastic material is supplied to an injection mould (3) which forms therein a blank (1) including a blank body (15) with a tubular portion (16). The tubular portion is open at one end (11) and has, in its other end (10), an emptying aperture or mouth (12) of the future container with a closure device thereat. The tubular portion (16) is displaced or drawn through an annular gap (4) for reduction of the wall thickness and axial extension thereof. After extension, the tubular portion is cut to the desired length. The thickness of the drawn material is between 0.1 and 0.15 mm. The closure device is confined within an outline formed by the drawn wall of the tubular portion.

18 Claims, 7 Drawing Sheets

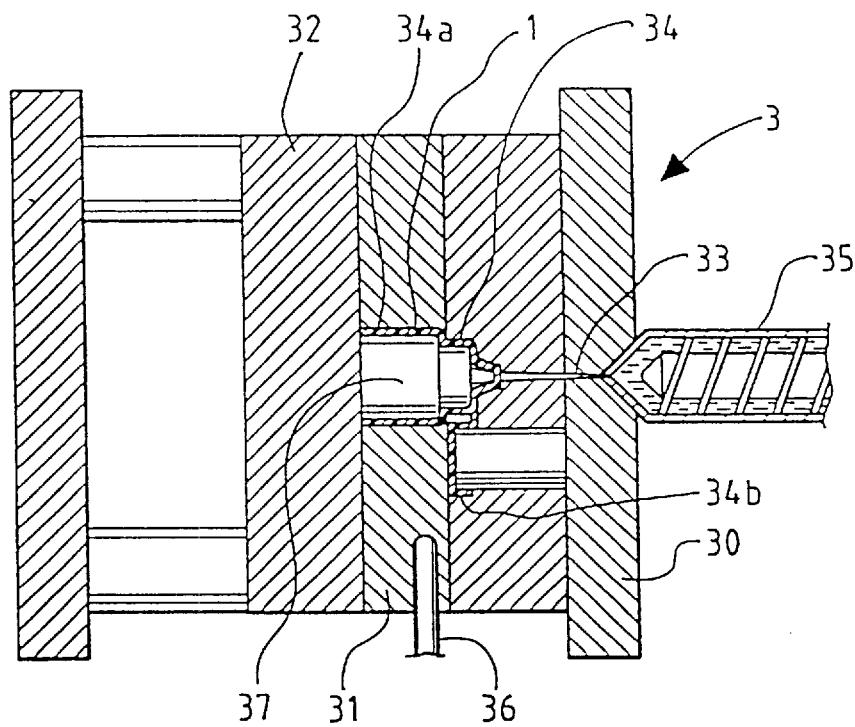
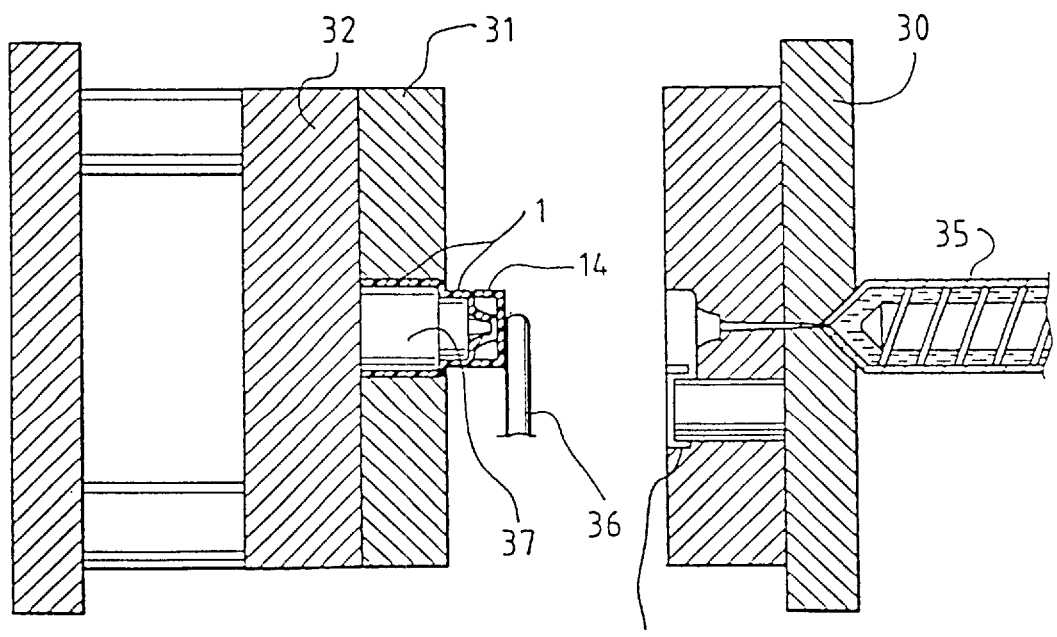

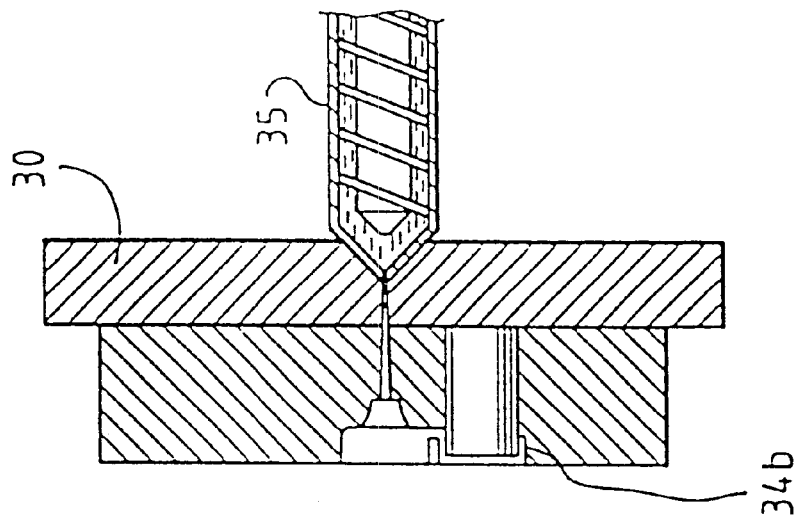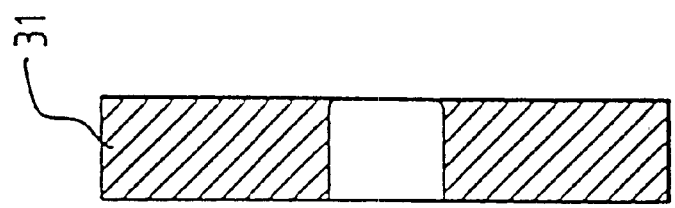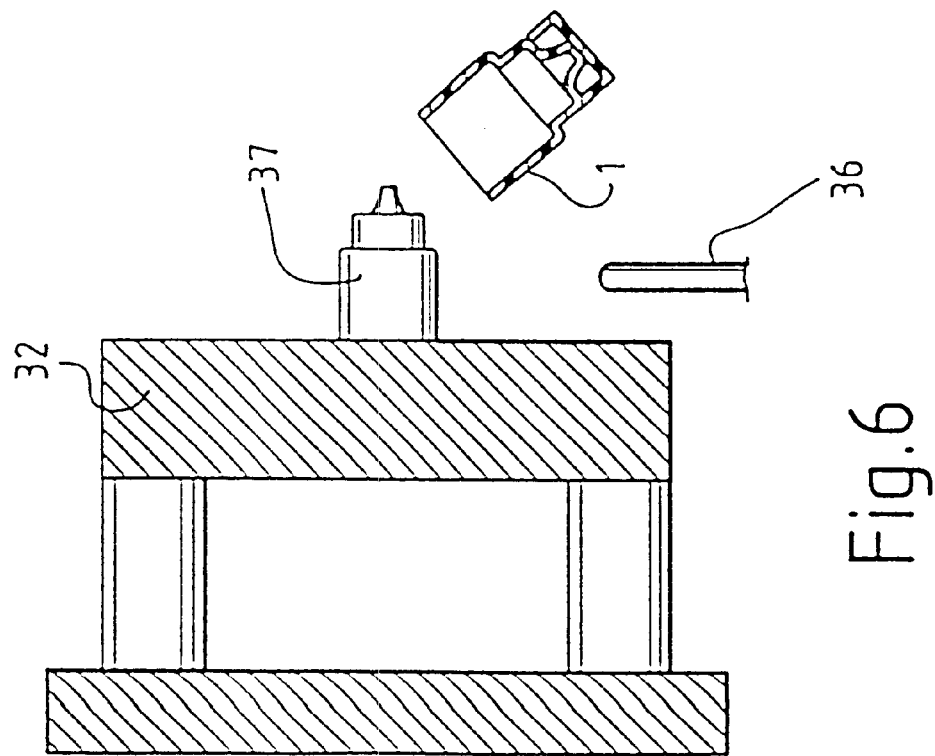
Fig.6

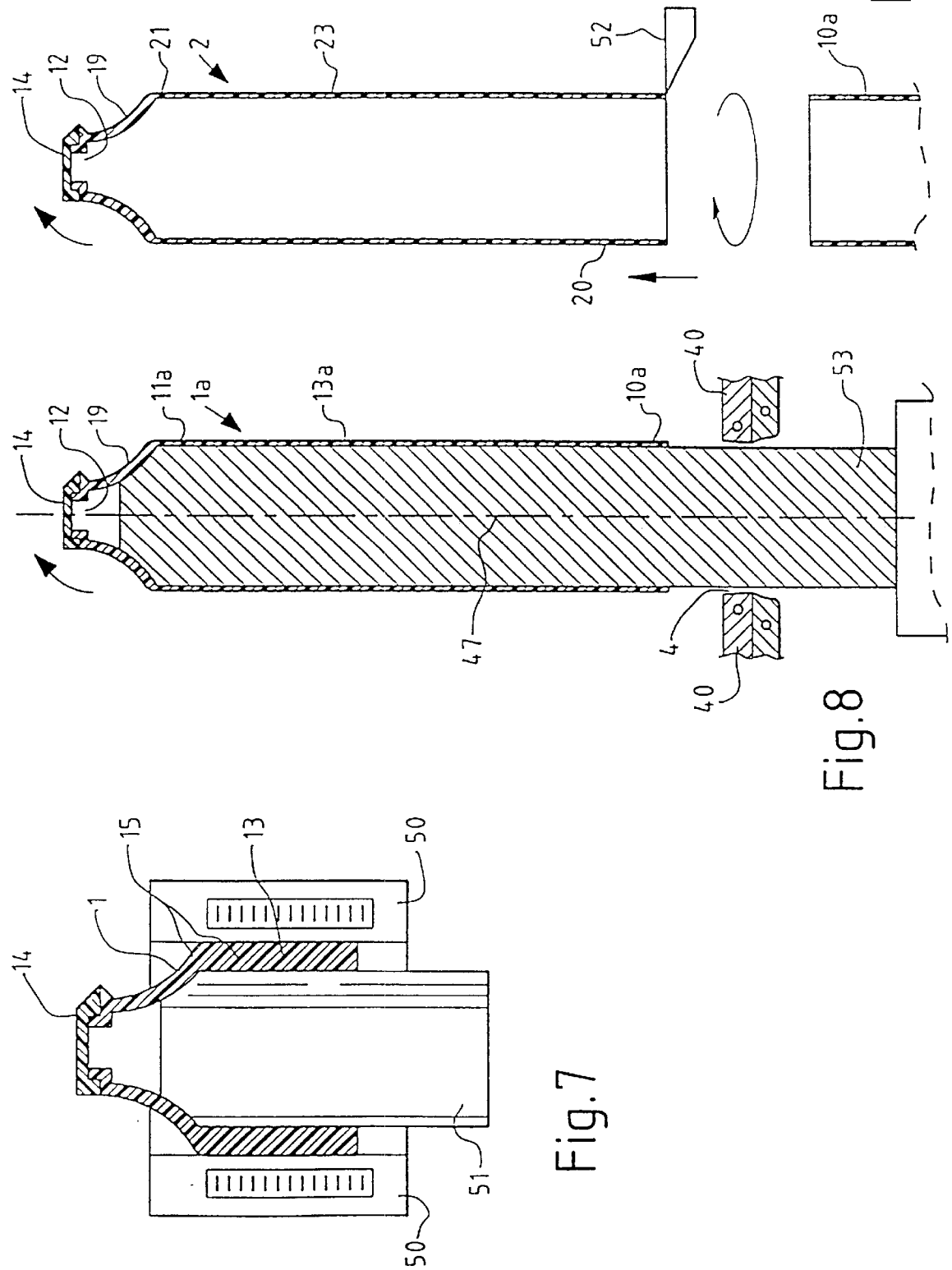

PROCESS OF MAKING A TUBULAR CONTAINER

This application is a continuation of application Ser. No. 08/875,781 filed on Dec. 8, 1997 now abandoned, which is a 371 of International Application PCT/SE96/00139 filed on Feb. 6, 1996 and which designated the U.S., claims the benefit thereof and incorporates the same by reference.

FIELD OF THE INVENTION

The present invention relates to a method and an apparatus for producing a tubular container. By tubular container it is meant a continuous walled container which has a cross-section taken through the wall of the container being substantially arbitrary e.g. circular, elliptical polygonal, having at least one corner, one flat surface, etc. A round, oval or polysided container form embodiments of the invented container.

The present invention relates to a method and an apparatus for producing a tubular container according to the preambles to the respective independent claims. By tubular container it is meant a continuous walled container which has a cross-section taken through the wall of the container being substantially arbitrary e.g. circular, elliptical polygonal, having at least one corner, one flat surface, an inwardly curved surface etc. A round, oval or polysided container form embodiments of the invented container.

In the injection moulding of tubular containers of plastic material, the maximum length which can be obtained for the tubular portion of the container is determined by the selected material and the wall thickness of the tubular portion. In addition, the wall thickness may not be less than approx. 0.5 mm irrespective of the plastic material employed in the injection moulding. This relationship is clarified further later in the body of this description.

DESCRIPTION OF THE PRIOR ART

In the injection moulding of containers, the flow length of the supplied molten plastic material and, thereby, the unit formed in the injection moulding process is maximized by the material thickness. In purely practical terms, it has proved that injection moulded products having a wall thickness of less than 0.5 mm cannot be produced in mass production lines. Cf., for example, the book by Menges/Mohren, "How to Make Injection Molds", 1986, Hanser Publishers (ISBN 0-19-520744-0 Oxford University Press), p. 66.

Tubular containers of plastic material have recently been adopted for use as tubes for, for example, toothpaste, handcreams etc. However, for the reasons outlined above it has been necessary to select material thicknesses for the tubular portion to be unnecessarily large or, otherwise it has been necessary to restrict the length of the tubular portion.

SUMARY OF THE INVENTION

The present invention realizes a considerable materials saving, with the result that the costs involved in producing such containers are drastically reduced as compared with that which applies to tubular containers produced according the prior art technique. Cost savings of the order of magnitude of 40% have been achieved.

Expedient embodiments of the present invention are defined below in the appended subclaims.

BRIEF DESCRIPTION OF THE FIGURES OF THE DRAWING

The present invention will now be described in greater detail hereinbelow with particular reference to a number of drawing figures, in which:

FIGS. 3–6 are cross-sections through an apparatus, the apparatus being illustrated in mutually subsequent production stages of the blank;

FIGS. 7, 8 and 9 show an apparatus for forming the blank by extending the tubular portion of the blank in different stages of the forming process.

DETAILED DESCRIPTION

Figure 1:
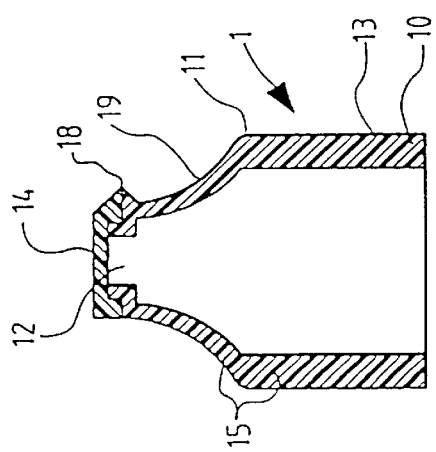
FIG. 1 shows a blank obtained by injection moulding.

FIG. 1 shows an axial cross-section through an injection moulded blank 1, comprising a tubular portion 13 and an adjacent portion 19 including an emptying aperture or mouth 12. As a rule, the associated portion tapers towards the mouth 12. The tubular portion and, thereby, the blank, is open at that end 10 which is opposed to the emptying aperture or mouth 12. At its other end 11, i.e. in that end which encompasses the mouth, the tubular portion 13 connects to the tapering portion 19. A closure means 14 included in the blank is shown as placed in a position where, as a rule, it sealingly abuts against material portions of the emptying aperture or mouth 12. The closure means 14 constitutes an integrated portion of the blank and is, via a hinge-like pivot 18, connected with the remainder of the blank.

Figure 2:
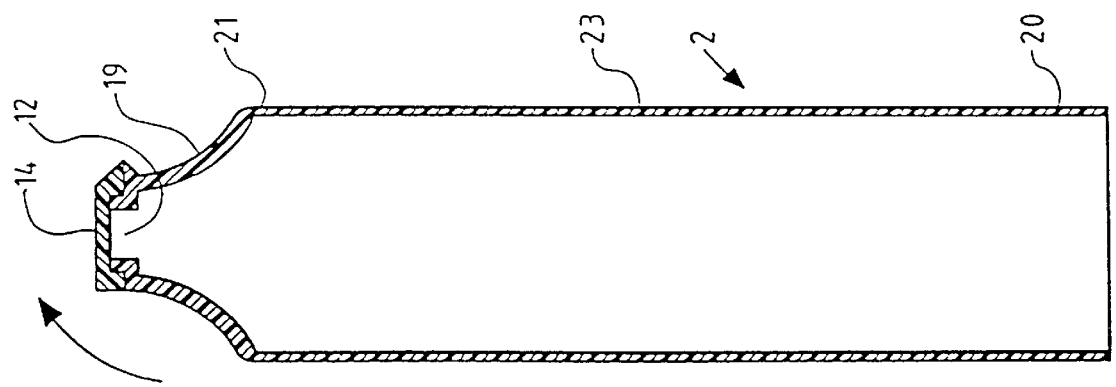
FIG. 2 shows a container formed by extension of the blank.

FIG. 2 shows an axial cross-section through that container 2 which is obtained once the blank illustrated in FIG. 1 has been extended, in that the material thickness of the tubular portion of the blank has been reduced on the extension or prolongation of the tubular portion. The tubular portion of the container, formed by the tubular part 13 of the blank, has been given reference numeral 23. The tapering portion 19 of the blank, together with the closure means 14 pivotally integrated with the tapering portion is not influenced by the forming process. The end 20 which is opposed to the emptying aperture or mouth 12 is still open, while the other end 21 of the tubular portion connects integrally with the tapering portion 19. All parts which are included in the container 2 constitute a unit in which the parts merge into one another without any mechanical joints or seams. In other words, the material in the container forms one single material piece (an integral unit).

FIGS. 3–6 show a section through an injection mould 3 for forming plastic material to the blank 1. The injection mould 3 comprises a forward portion 30, an intermediate portion 31 and a rear portion 32. The portions of the injection mould together enclose a forming cavity 34. The Figures show the injection mould once the plastic material has been supplied into the forming cavity 34.

FIGS. 7–8 schematically illustrate longitudinal sections through parts of an apparatus for extending the blank 1 formed in the injection mould 3.

FIG. 7 shows that part of the apparatus where the tubular portion 13 of the blank 1 is surrounded by heating means 50 which abut against the outer surface of the tubular portion. A mandrel 53 is generally inserted into the blank so as to stabilize the blank during the heating process. In certain embodiments, the mandrel 53 is also provided with means for temperature conditioning of the blank.

Figure 8A:
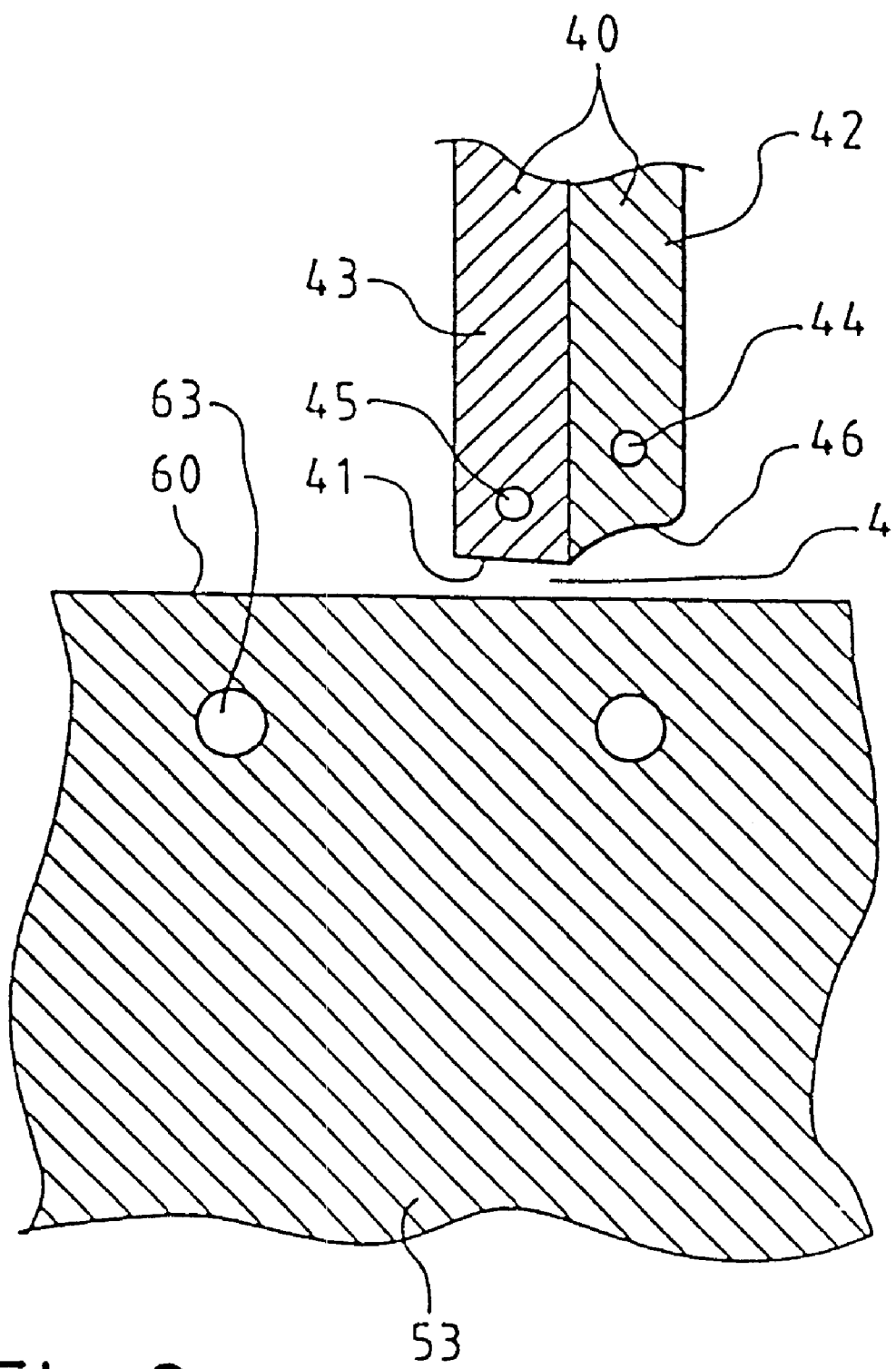
FIGS. 8a,b show parts of the apparatus of the FIGS. 7–9 for extending the tubular portion of the blank.

FIG. 8 shows the blank 1a once the material in its tubular portion 13 has-passed through a gap 4 (cf. FIG. 8a) for reduction of the material thickness under simultaneous extension of the blank.

Figure 8B:
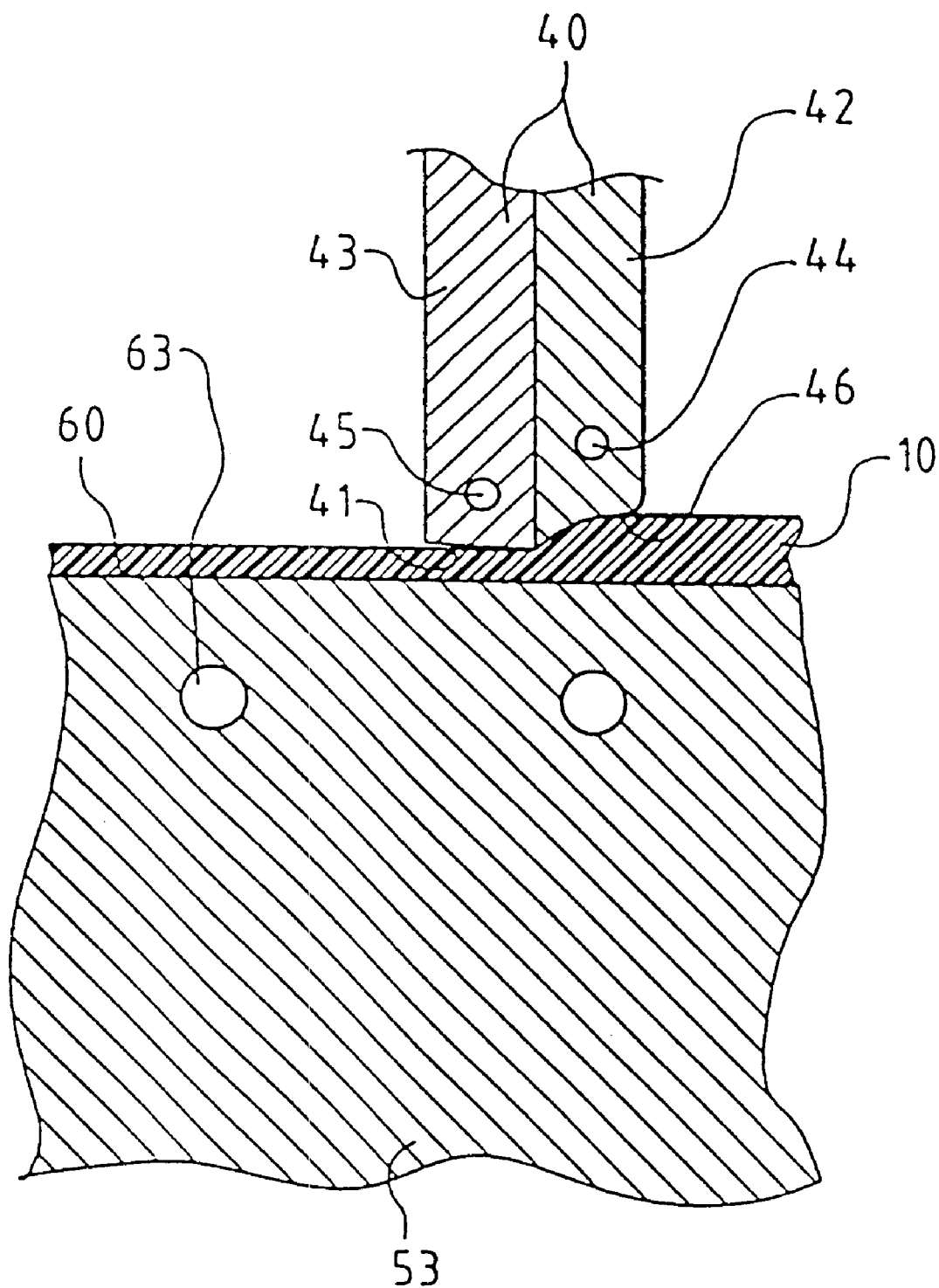

FIGS. 8a and, 8b show in detail portions of a drawing ring 40 and drawing ring mandrel 53 co-operating with the drawing ring when both of these device's are displaced by drive means (not shown in the Figures) to positions in which the gap 4 is formed between the drawing ring and the drawing ring mandrel. FIG. 8a shows the gap 4 without any plastic material being located therein, and FIG. 8b shows the wall of the blank 1 on passage through the gap 4 formed by the drawing ring 40 and the drawing ring mandrel 53.

In FIGS. 8a, b the drawing ring 40 is shown in one embodiment in which it is composed of two part rings 42,43. Each drawing ring is provided with a channel 44,45 for conveying thermal medium. The drawing ring has a guide surface 46 facing towards the drawing ring mandrel 53, against which surface the material in the blank is pressed on passage through the gap 4. The guide surface makes an angle with the surface 60 of the drawing ring mandrel 53 and merges into a drawing ring surface 41 located substantially parallel with the surface of the drawing ring mandrel 53.

The surface 41 constitutes the bounding definition of the gap in that region of the gap where this is narrowest. The drawing ring mandrel 53 is generally provided with channels 63 for thermal medium.

In FIG. 3, the three parts 30,31,32 from which the injection mould 3 is constructed are united and form the inner cavity 34 of the injection mould, with a form corresponding to the contemplated form or shape of the blank. A channel 33 runs through the forward end 30, and discharges in the inner cavity 34 in the region thereof where the emptying mouth 12 of the contemplated container is formed. The inner forming cavity 34 comprises two mutually interconnected part cavities, the one 34a for forming the blank body and the other 34b for forming the closure means 14 of the blank. An injection mould nozzle 35 is shown in connection with the channel 33. An arm 36 is displaceable by means (not shown) to and from the starting position illustrated in FIG. 3.

Figure 4:
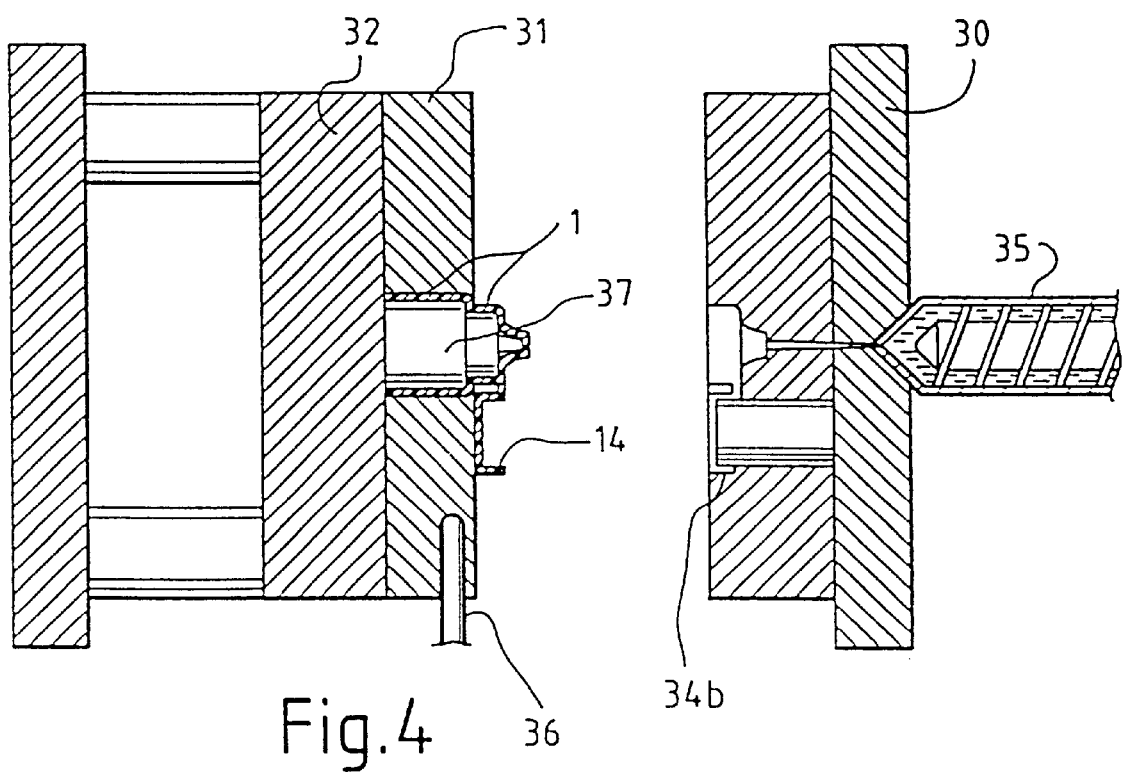

In FIG. 4, the injection mould is shown with the forward portion 30 separated from the intermediate portion 31 interconnected with the rear portion 32. In this position the mould is open and parts of the blank 1 are exposed.

FIG. 5 shows the arm 36 displaced to a position in which the arm presses the closure means 14 against the emptying mouth or aperture 12 of the blank. During displacement from the position which is shown in FIGS. 3 and 4 the arm is moved to a position causing the arm, when traveling from said position to the position in FIG. 5, to displace closure means 14 in a pivotal motion from the position assumed by the closure means in FIG. 4 to the position assumed by the closure means in FIG. 5.

In FIG. 6, the intermediate portion 31 of the injection mould has been displaced from a position in which the intermediate portion abuts against the rear portion 32. The blank 1 has been removed from the male portion 37 which is located within the blank on injection moulding thereof. The arm 36 is moved back to its starting position.

FIG. 7 shows the blank 1 placed between one or more heating means 50. In certain practical applications, in particular in large material thickness of the tubular portion 13 of the blank. The mandrel 53 which is inserted into the blank constitutes a supplementary heat source for the material during the heating cycle. The mandrel is generally provided with heat-conditioning means, for example channels 63 for a thermal medium.

FIG. 8 shows the blank la once the drawing ring 40 has passed the tubular portion of the blank in the axial direction thereof and during reduction of the material thickness of the tubular portion. The drawing ring is disposed to maintain a surface temperature in its surface 41,46 facing towards the plastic material which is adjustable to a level within the range of between approx. 50 and 70° C.

The mandrel (drawing ring mandrel) 53 is disposed to be at least partly located within the blank 1. The drawing ring mandrel 53 forms the gap 4 together with the drawing ring 40. The mandrel 53 is disposed to maintain for the surface, facing the drawing ring 40 for forming the gap 4, a temperature which is adjustable at a level within the range of between approx. 50 and 100° C.

The gap 4 has a minimum gap width which is less than the material thickness of the injection moulded blank. The gap width is within the order of magnitude of between 0.1 and 0.9 mm, preferably between 0.13 and 0.55 mm, and in special cases between 0.13 and 0.45 mm. After passage of the gap, the material thickness of the tubular portion of the blank substantially corresponds with the gap width of the gap employed in the reduction of the thickness of the material in the tubular portion of the blank.

The size of the extension of the tubular portion and the size of the reduction are adapted to suit properties desired in the finished container. The size of the reduction is selected so as to lie within the range of between 2.5 and 5.0 times, preferably within a range of between 3.5 and 4.5 times.

FIG. 9 shows the finished container (cf. FIG. 2) in position in the end station once trimming has taken place of the end region of the axially extended tubular portion of the blank 1 a. As a result of this trimming operation, a substantially uniform defining edge will be achieved in respect of the opening or aperture in the end region 20 opposed to the emptying aperture or mouth 12.

The container 2 illustrated in FIGS. 2 and 9 has a thin-walled tubular portion 23 which has, in its one end 20, an opening whose size (cross-section) corresponds to the inner cross-section of the tubular portion. This facilitates the supply of contents into the container. Closure of the filled container after filling is put into effect simply by means of a welding process, for example two heat punches which heat the material to fusion temperature. The thin-walled material rapidly assumes the form or shape which is determined by the form of the dies, as a rule a straight form, and rapidly arrives at the temperature which is necessary for the material to fuse together and form a tight seal. At its other end 21, the container is of a form and construction which wholly correspond with that which it obtains as a blank in connection with the injection moulding. The thin wall of the tubular portion of the container entails that the material is relatively easily deformable and that emptying of the container will thereby be facilitated.

Preferred thermoplastic materials in the practical application of the above described technology are polypropylene (PP), polyethylene terephthalate (PET), polyolefines (PE) and certain thermoplastic elastomers, for example styrene elastomers (SEBS). It will be obvious to a person skilled in the art that the technique as disclosed in the foregoing is generally applicable to all plastic materials which have similar reformation properties, i.e. materials possessing properties corresponding to those required for a container to be formed in the application of the above described technology.

It has surprisingly proved that, for certain given materials, for example polypropylene (PP), polyethylene terephthalate (PET), and polyolefines (PE), it is possible to produce containers whose tubular portion has so-called "dead fold"

properties. To achieve such properties, a material thickness is selected for the tubular portion of the container within the range of between 0.1 and 0.15 mm. The term "dead fold" properties is taken to signify those properties which are known from tubes of aluminum, i.e. that the tube can retain its form after compression. The resilient return action which is known from earlier tubes of plastic material will thereby thus be avoided.

"Dead fold" properties are wholly unique properties in thin-walled plastic tubes. This ensures an almost complete emptying of the tube on use, which also prevents oxygen/air from being drawn back into the tube in connection with its being emptied.

The above detailed description has referred to but a limited number of embodiments of the present invention, but a person skilled in the art will readily perceive that the present invention encompasses a large number of embodiments without departing from the spirit and scope of the claims.

What is claimed is:

1. A method of producing a substantially tubular container body of plastic material which is open at one end and has at an opposite end, an emptying mouth with a closure means thereat, the container body having a substantially cylindrical wall between said ends thereof, the closure means being integral with said opposite end of the container body, said method comprising introducing molten plastic material into an injection mould to form therein a blank comprising a body having a tubular portion which is open at one end and has a mouth at its opposite end and a closure means integrally formed with said body and providing a hinged closing member for said mouth, subjecting the tubular portion of said blank to a drawing operation in which a wall of said tubular portion passes through a gap to cause said wall to undergo a reduction in thickness while being elongated in length to form the tubular container body whose one end which is open and whose opposite end formed by said mouth with said closure means integrally formed thereat, the reduction of said wall thickness being between 2.5 and 5 times, severing the tubular article at said open end to prepare said open end for closure to form a container after the tubular article is filled with its contents, and wherein on removal of the blank from the injection mould, a mechanical device displaces the closure means to a position in which all parts of the closure means are located at a distance from a geometric center axis of the blank at most amounting to a distance between said geometric center axis and a surface of the gap located most proximal to said center axis.

2. A method as claimed in claim 1, wherein the reduction in thickness of the wall of the tubular portion of the blank is between 3.5 and 4.5 times.

3. A method as claimed in claim 1, wherein said closure means and said body of said blank are formed in said injection mould in positions in which said mouth is open and is not closed by said closure means, after which said mould is opened and said hinge closing member is displaced to close said mouth.

4. A method as claimed in claim 3, wherein said closing member is placed on the mouth of said body by pivoting the closure means onto the mouth of the body.

5. A method as claimed in claim 3, wherein said body of said blank is formed with a tapered portion joining the tubular portion and the mouth, said closure means being formed so as to be confined within an outline formed by said tubular portion.

6. A method as claimed in claim 1, comprising heating the blank before passing it through said gap.

7. A method as claimed in claim 1, wherein after passage of the blank through said gap in said drawing operation, the wall has a thickness between 0.1 and 0.9 mm.

8. A method as claimed in claim 7, wherein the wall thickness after drawing between 0.1 and 0.15 mm.

9. A method as claimed in claim 1, wherein said tubular portion of the article is substantially circular.

10. A method of producing a substantially tubular container body of plastic material which is open at one end and has at an opposite end, an emptying mouth with a closure means thereat, the container body having a substantially cylindrical wall between said ends thereof, the closure means being integral with said opposite end of the container body, said method comprising introducing molten plastic material into an injection mould to form therein a blank comprising a body having a tubular portion which is open at one end and has a mouth at its opposite end and a closure means integrally formed with said body and providing a hinged closing member for said mouth, subjecting the tubular portion of said blank to a drawing operation in which a wall of said tubular portion passes through a gap to cause said wall to undergo a reduction in thickness while being elongated in length to form the tubular container body whose one end which is open and whose opposite end formed by said mouth with said closure means integrally formed thereat, the reduction of said wall thickness being between 2.5 and 5 times, severing the tubular article at said open end to prepare said open end for closure to form a container after the tubular article is filled with its contents, and wherein on removal of the blank from the injection mould, a mechanical device displaces the closure means to a position in which all parts of the closure means are located at a distance from a geometric center axis of the blank at most amounting to a distance between said geometric center axis and a surface of the gap located most distant to said center axis.

11. A method as claimed in claim 10, wherein the reduction in thickness of the wall of the tubular portion of the blank is between 3.5 and 4.5 times.

12. A method as claimed in claim 10, wherein said closure means and said body of said blank are formed in said injection mould in positions in which said mouth is open and is not closed by said closure means, after which said mould is opened and said hinge closing member is displaced to close said mouth.

13. A method as claimed in claim 12, wherein said closing member is placed on the mouth of said body by pivoting the closure means onto the mouth of the body.

14. A method as claimed in claim 12, wherein said body of said blank is formed with a tapered portion joining the tubular portion and the mouth, said closure means being formed so as to be confined within an outline formed by said tubular portion.

15. A method as claimed in claim 10, comprising heating the blank before passing it through said gap.

16. A method as claimed in claim 10, wherein after passage of the blank through said gap in said drawing operation, the wall has a thickness between 0.1 and 0.9 mm.

17. A method as claimed in claim 16, wherein the wall thickness after drawing between 0.1 and 0.15 mm.

18. A method as claimed in claim 10, wherein said tubular portion of the article is substantially circular.

* * * * *